(12) United States Patent
Naik et al.

(10) Patent No.: US 7,835,276 B2
(45) Date of Patent: Nov. 16, 2010

(54) ADMISSION CONTROL MECHANISM FOR MULTICAST RECEIVERS

(75) Inventors: Chickayya G. Naik, San Jose, CA (US); Toerless Eckert, Mountain View, CA (US); Senthilkumar Krishnamurthy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 11/026,465

(22) Filed: Dec. 30, 2004

(65) Prior Publication Data

US 2006/0146857 A1    Jul. 6, 2006

(51) Int. Cl.
*H04L 12/28* (2006.01)
(52) U.S. Cl. .............. 370/230; 370/390; 370/432
(58) Field of Classification Search ............ 370/390, 370/432
See application file for complete search history.

(56) References Cited

U.S. PATENT DOCUMENTS

| | | | |
|---|---|---|---|
| 5,394,402 A | 2/1995 | Ross | |
| 5,959,989 A | 9/1999 | Gleeson et al. | |
| 6,038,322 A | 3/2000 | Harkins | |
| 6,215,878 B1 | 4/2001 | Harkins | |
| 6,553,028 B1 | 4/2003 | Tang et al. | |
| 6,735,201 B1 | 5/2004 | Mahajan et al. | |
| 6,785,274 B2 | 8/2004 | Mahajan et al. | |
| 6,804,236 B1 | 10/2004 | Mahajan et al. | |
| 6,831,917 B1 | 12/2004 | Cheriton | |
| 6,839,348 B2 | 1/2005 | Tang et al. | |
| 6,941,457 B1 | 9/2005 | Gundavelli et al. | |
| 7,079,537 B1 * | 7/2006 | Kanuri et al. | 370/392 |
| 7,362,776 B2 * | 4/2008 | Meier et al. | 370/468 |
| 2002/0165920 A1 * | 11/2002 | Keller-Tuberg | 709/204 |
| 2003/0142671 A1 * | 7/2003 | DeRango et al. | 370/390 |
| 2004/0205215 A1 | 10/2004 | Kouvelas et al. | |

OTHER PUBLICATIONS

Shacham et al, Admission Control Algorithms for Multicast Sessions with Multiple Streams; p. 557, IEEE Journal on Selected Areas in Communications, vol. 15, No. 3, Apr. 1997.*

(Continued)

*Primary Examiner*—Donald L Mills
*Assistant Examiner*—Henry Baron
(74) *Attorney, Agent, or Firm*—Cesari and McKenna, LLP (57) ABSTRACT

A method and system for controlling admission of an end user to a multicast channel over a network implementing a source filtering protocol. Incoming packet traffic received by an edge router is snooped and, when a request to join a multicast channel is received, the traffic is analyzed. Any service policy associated with the traffic class is found and applied to packet traffic from the requesting user. The actions include accepting membership in a group associated with a multicast channel and pushing the packets to the end user. If the action is to deny membership, then the multicast packets are prevented from reaching the end user. In addition information is logged and may be used for billing purposes or for accumulating marketing or other such information. Also, the actions may be to limit the number of routing states, by denying admittance to a groups once a limit number of requests to join, or other such parameter, is reached. Such limiting will substantially prevent DOS attacks on a multicast router.

19 Claims, 6 Drawing Sheets

OTHER PUBLICATIONS

Karlsson et al, Packet Video and Its Integration into the Network Architecture; IEEE Journal on Selected Areas in Communications, vol. 7, No. 5, Jun. 1989.*

Cisco IOS Release 12.2(13)T, entitled Modular QoS CLI (MQC) Unconditional Packet Discard, Cisco Systems, Inc., 2004, pp. 1-14.

Helmy, Ahmed, et al., PIM—Protocol Independent Multicast, University of Southern California, Jan. 14, 2005, pp. 1-3.

Network Sorcery, IGMP—Internet Group Management Protocol, 2005, pp. 1-12.

Fenner, et al., Internet Draft, entitled Bootstrap Router (BSR) Mechanism for PIM Sparse Mode, Aug. 2003, Internet Engineering Task Force, pp. 1-33.

Rekhter, et al., RFC 1771, entitled A Border Gateway Protocol 4 (BGP-4), Mar. 1995, Network Working Group, pp. 1-54.

Cain, et al., RFC 3376, entitled Internet Group Management Protocol, Version 3, Network Working Group, pp. 1-27, Oct. 2002.

Bates, et al., RFC 2858, entitled Multiprotocol Extensions for BGP-4, Network Working Group, pp. 1-11, Jun. 2000.

Reynolds, et al., RFC 1700, entitled Assigned Numbers, Network Working Group, pp. 1-215, Oct. 1994.

* cited by examiner

ADMISSION CONTROL MECHANISM FOR MULTICAST RECEIVERS

FIELD OF THE INVENTION

This invention relates generally to computer networks, and more particularly, to controlling multicast classes of traffic destined for hosts or end users in a computer network.

BACKGROUND OF THE INVENTION

Data communication in a computer network involves the exchange of data between two or more entities interconnected by communication links, segments and sub-networks. These entities are typically software processes executing on hardware computer platforms, such as end nodes and intermediate nodes. Communication software executing on the end nodes correlate and manage data communication with other end nodes. The nodes typically communicate by exchanging discrete frames or packets of data according to predefined protocols, such as the Transmission Control Protocol/Internet Protocol (TCP/IP).

An intermediate node, such as a router or switch, executes routing protocols used to direct the transmission of data traffic between the end nodes, such as hosts or users. Typically, the router directs network traffic based on destination address prefixes contained in the packets, i.e., the portions of destination addresses used by the routing protocol to render routing ("next hop") decisions. Examples of such destination addresses include Internet Protocol (IP) version 4 (IPv4) and version 6 (IPv6) addresses. A prefix implies a combination of an IP address and a mask that cooperate to describe an area or range of the network that a router can reach, whereas a route implies a combination of a set of path attributes and a prefix.

A local area network (LAN) is an example of a subnetwork that provides relatively short distance communications among the intermediate nodes. A wide area network (WAN) enables log distance communication over paths provided by public or private telecommunication facilities. The Internet is an example of a WAN that connects disparate computer networks throughout the world providing global communications between nodes and various networks. A router or switch may interconnect sub-networks to extend the effective "size" of the computer network. However, the router or switch that joins to LAN's is often called a "last hop," or an edge router or switch, since it resides at the "edge" of the Internet. In this application "edge router," "edge switch" or "switch" are used synonymously to designate this edge device.

Unicast data transfer (i.e., unicast forwarding) involves forwarding a data packet from a single sending process of an end node ("source") to a single receiving process of an end node ("receiver") on the computer network. Often the destination of the data packet issued by a source may be more than one, but less than all of the receivers on the network. This type of multicast data transfer (i.e., multicast forwarding) is typically employed to segregate communication between groups of receivers on the network. IP multicasting, in particular, may be used to disseminate data to a large group of receivers on the network.

To effect IP multicasting, the source generally specifies a destination IP address that is a multicast group address for the message and, as such, can only represent receivers of packets. The IPv4 (or IPv6) address range is subdivided into different prefixes, one of which is designated for use by IP multicast. Receivers typically notify their communication software of their desire to receive messages destined for the multicast group address; this is called "joining a multicast group." These receiving members then "listen" on the multicast address and, when a multicast message is received at a receiver, it delivers a copy of the message to each process that belongs to the group.

IP multicasting relies on (i) a group management protocol to establish and maintain local multicast group membership, and (ii) multicast routing protocols to route packets efficiently. The Internet Group Management Protocol (IGMP) manages packet communication between hosts and their local multicast router, letting them join or leave groups. That is, IGMP is used to send a group membership message from a host to its directly connected router, indicating that the host wants to join a group (address) as a receiver. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast group address in the destination address field of an IP header) are forwarded between routers using multicast routing protocols. IGMP Version 3 (IGMPv3) adds support for "source filtering," i.e., the ability for a system to report interest in receiving packets "only" from specific source addresses (INCLUDE operation), or packets from "all but" specific source addresses (EXCLUDE operation).

Multicast routing protocols construct distribution trees through the network and direct multicast forwarding. The multicast distribution trees define the path that multicast traffic will take through the network to group members. These paths are based on source or shared multicast distribution trees. A multicast distribution tree is shared when any source (host) originating data traffic destined to a group address of a multicast group uses the same distribution tree to forward data to the receivers. In contrast, a source distribution tree is a separate, shortest path tree (SPT) built for each source originating traffic to the multicast group.

A rendezvous point is a specific router that is designated as the root of a shared multicast distribution tree. An announcement protocol is used to select and announce rendezvous points to all routers in the network. However, an alternative to using an announcement protocol to automatically advertise rendezvous points to all routers in the network is to manually configure the identity of the rendezvous points on all of the routers. Examples of such an announcement protocol include the Auto-RP multicast protocol available from Cisco Systems Inc. and the Bootstrap Router (BSR) described in *Bootstrap Router (BSR) Mechanism for PIM Sparse Mode*, Internet Engineering Task Force Internet-Draft, draft-ietf-pim-sm-bsr-03.txt, by Fenner, et al. February 2003. Examples of multicast routing protocols that use a rendezvous point include Protocol Independent Multicast-Sparse Mode (PIM-SM) and Bidirectional PIM (BIDIR-PIM) protocols. Other multicast protocols that do not require a rendezvous point include PIM dense mode (PIM-DM) and PIM source specific multicast (PIM-SSM) protocols.

IP multicast may be deployed on a computer network using a specific rendezvous point to build a shared multicast distribution tree for a multicast group falling within a destination address prefix or to build a separate SPT for each source originating traffic to the multicast group. Broadly stated, a router joins a multicast group (distribution tree) towards the rendezvous point or source. The interface on the router leading towards the rendezvous point or source is an ingress interface. Depending upon the multicast routing protocol, there is usually only one ingress interface on the router receiving multicast packets for a particular route. One or more interfaces on the router leading towards the hosts (receivers)

are egress interfaces. The receivers are leaves or nodes on the distribution tree. Packets are sent from a source to the root (rendezvous point or source itself) of the distribution tree, where they are forwarded towards the branches and out to the nodes that represent the receivers. On each node, packets are received on the ingress interface towards the root of the tree and packets are forwarded out egress interfaces towards the receivers or nodes.

IP protocol of the TCP/IP Reference Model defines five classes of IP addresses. Class D IP addresses, which begin with the bit sequence "1110," are used for sourcing multicast messages. That is, a host or entity wishing to send a multicast message utilizes a class D IP address. To receive multicast messages, entities typically register with one or more multicast routers. Registration may be accomplished via the IGMP, which defines a set of registration messages and operations that are used by entities to join and leave multicast groups (e.g., JoinGroup and LeaveGroup), and is implemented as part of the IP protocol. *Internet Group Management Protocol, Version 3,Request for Comments (RFC)* 3376, by Cain et al., October 2002, is hereby incorporated herein by reference as though fully set forth herein.

Specifically, a receiver uses IGMP to communicate a request to join a multicast group address to a last-hop router. The router communicates that request to its neighboring routers (neighbors) on the link towards the rendezvous point (for a shared tree) or source (for a SPT) using a multicast routing protocol, such as Protocol Independent Multicast (PIM). Announcement protocols, known in the art, are used to distribute group range-to-rendezvous point address mapping configuration to all PIM-enabled routers that participate in the network topology. Collectively the routers construct a multicast distribution tree rooted at a rendezvous point or source for that group address and having a branch (link) that "pulls" packets towards the last-hop router. Note that only a single multicast router (forwarder) should forward packets for a route over a specific link of the tree.

A computer network may also be segregated into a series of logical network segments. U.S. Pat. No.5,394,402, issued Feb. 28, 1995 (the "402 Patent"), and U.S. Pat. No. 5,959,989, issued Feb. 28, 1999 (the "989 Patent" that is commonly owned with this application), for example, disclose multicast distributions in a VLAN environment. These patents are incorporated herein by reference. Specifically, according to the '402 Patent, any number of physical ports of a particular switch may be associated with any number of groups within the switch by using a virtual local area network (VLAN) arrangement that virtually associates the port with a particular VLAN designation.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. However, since more than one port can be associated with the same VLAN, multicast transmissions will be sent to all those ports, possibly flooding those ports.

To limit the traffic caused by registration messages, only one entity per LAN typically transmits such a request. Other interested entities listen in on the requests of their neighbors and rely on the first subscription request, rather than making their own individual requests, to ensure that messages are delivered to their LAN. Bridges and switches may perform additional filtering so that multicast routers receive only one subscription request per router interface. In particular, bridges and switches may be configured to monitor the IGMP messaging between subscribing entities and multicast routers to learn which of their ports lead either to a multicast router or to at least one entity subscribing to a particular multicast group address. This configuration is referred to as IGMP snooping.

To distribute multicast messages, routers may employ a multicast routing algorithm, such as multicast open shortest path first (MSOPF) or distance vector multicast routing protocol (DVMRP). With MSOPF and DVMRP, routers construct a spanning tree per multicast group address that basically includes all group members. The routers is then build multicast forwarding tables for use in distributing multicast messages. DVMRP, in particular, creates an overlay topology on top of the computer network consisting of several multicast-capable islands interconnected by tunnels. Upon receipt of a multicast message, both MSOPF and DVMRP utilize a multicast forwarding algorithm, such as reverse path forwarding (RPF), to determine whether the message should be forwarded. In response to receiving a multicast message from a particular source, a multicast router using RPF first determines which interface it uses to send unicast messages to the source. If the multicast message was received on the same interface used to send unicast messages, the router forwards the multicast message onto those interfaces that are coupled to subscribers of the message. If the multicast message is received on an interface other than the one used to reach the source, the router discards the message as it is probably a duplicate of a message already forwarded by the router.

Known multicast distribution techniques provide access control lists (ACL) that are implemented at the internetwork layer, L3, of the well known Internet Protocol stack. But ACL's at the L3 layer do not meet the requirements of edge routers with multiple ports connected to a VLAN. An ACL can be configured to accept or deny an IGMP request, but for end users connected by a VLAN to several ports of the respective edge router, the multicast is sent to all those ports. As mentioned above the same limitations exists where the ACL's are tied to specific platforms and where the ports may be flooded with multicast requests and subsequent transmissions. Moreover, configuring such ACL's with two IP source addresses, one for the reporter and one for the channel to be joined under the IGMPv3 protocol is not feasible, and such ACL's lack multicast information base (MIB) support.

Some switching platforms support IGMP filtering using ACL's, but do not implement the source filtering of the IGMPv3 protocol.

Multicast has found its way into cable TV, where providers are sending "video over IP" to end users. This is typically achieved using the Ethernet-to-the-home (ETTH) deployment where video, voice and data are carried over a single Ethernet media to the end users. IP multicast provides for optimal bandwidth utilization, so the content providers multicast video streams via ETTH using PIM-SM (Protocol Independent Multicast-Spare Mode) or Bi-directional PIM.

In the ETTH deployment, each video channel is assigned a unique multicast group address (a Class D address) and the video channel is distributed in User Defined Protocol (UDP) streams to the multicast group address. Each end user has a set-top-box that has an IP stack and an IGMP stack. The user via the set-top-box sends a IGMP join to the edge router which creates the necessary PIM routing states and starts pushing the video streams to the end user. Access lists are currently used at the L3 interface layer. These access lists are defined to accept/deny and IGMP request, but such an implementation will send multicast traffic to all edge router ports that are connected to a given VLAN, possibly flooding the ports. Access lists are also used in some switch platforms, but these suffer from the same limitation as the L3 implementations.

In the known ETTH deployment there is a need for a mechanism where an end user in a VLAN specifies a particular video channel.

The present invention is directed to controlling admission to multicast groups that provides source filtering; implementing multicast distribution that does not flood switch ports; and providing a mechanism for the service provider to implement a service/distribution policy.

SUMMARY OF THE INVENTION

The present invention is directed to a system and method for controlling access to multicast data traffic at end nodes in a computer network. An Admission Control Module (ACM) executes on an intermediate node of the network to monitor incoming request issued by the end nodes to join, leave or modify membership in multicast groups designated to receive the data. The ACM accepts or denies these requests based on a configurable service policy. The ACM also prevents attacks, such as denial of service (DOS) on the intermediate node by limiting the number of joins and leave states for the multicast group. Moreover, the ACM cooperates with an Explicit Tracking Database maintained by the intermediate node to record statistics of multicast data traffic.

In the illustrative embodiment, the intermediate node is a edge (switch) router and the end nodes are multicast receivers or hosts. The incoming requests are preferably IGMP join and leave packets directed to the multicast group destined to receive the multicast data, typically video streams or channels. Furthermore, the service policy comprises a plurality of data structures configurable by a network administrator via a Command Language Interface (CLI) of the router. The data structures illustratively include a Traffic Classification Map (traffic map) and an associated policy map.

Specifically the ACM comprises an IGMP snooping process that cooperates with the traffic and policy maps to control access to the video channels at the hosts. The IGMP snooping process examines the incoming IGMP packets and extracts information, for example: source, multicast group and reporter address, as well as port number, etc. This information is applied to the traffic map that classifies the multicast data traffic at least by the following parameters: the IP address of the requesting host, the Media Access Control (MAC) address of the host, the IP address of the multicast groups being joined, the source channel and group addresses, the input interface and Local Area Network (LAN) address of the requester, the IGMP version number, the maximum number of hosts allowed on a port, and the maximum number of groups or channels allowed on a specific port. If the information matches the parameters, an associated policy map is entered to determine if any action associated with the class is required. The policy map of actions includes accepting or denying admission of a requester, logging the time and channel packets sent to the requester, and limiting the number of active routes the edge switch is allowed to form and/or support. Other actions may be used in specific applications.

Advantages of the ACM include, at least: controlling access to multicast hosts via the traffic and policy maps; using the Explicit Tracking database to log multicast usage statistics on a per port per user basis; and compiling statistics. These data are regularly sent to the service provider to be used for billings of the end users and for marketing profiles. ACM also limits multicast routing states created on a switch to provide, for example, security from DOS attacks that are often used by hackers to invade such switches and routers.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
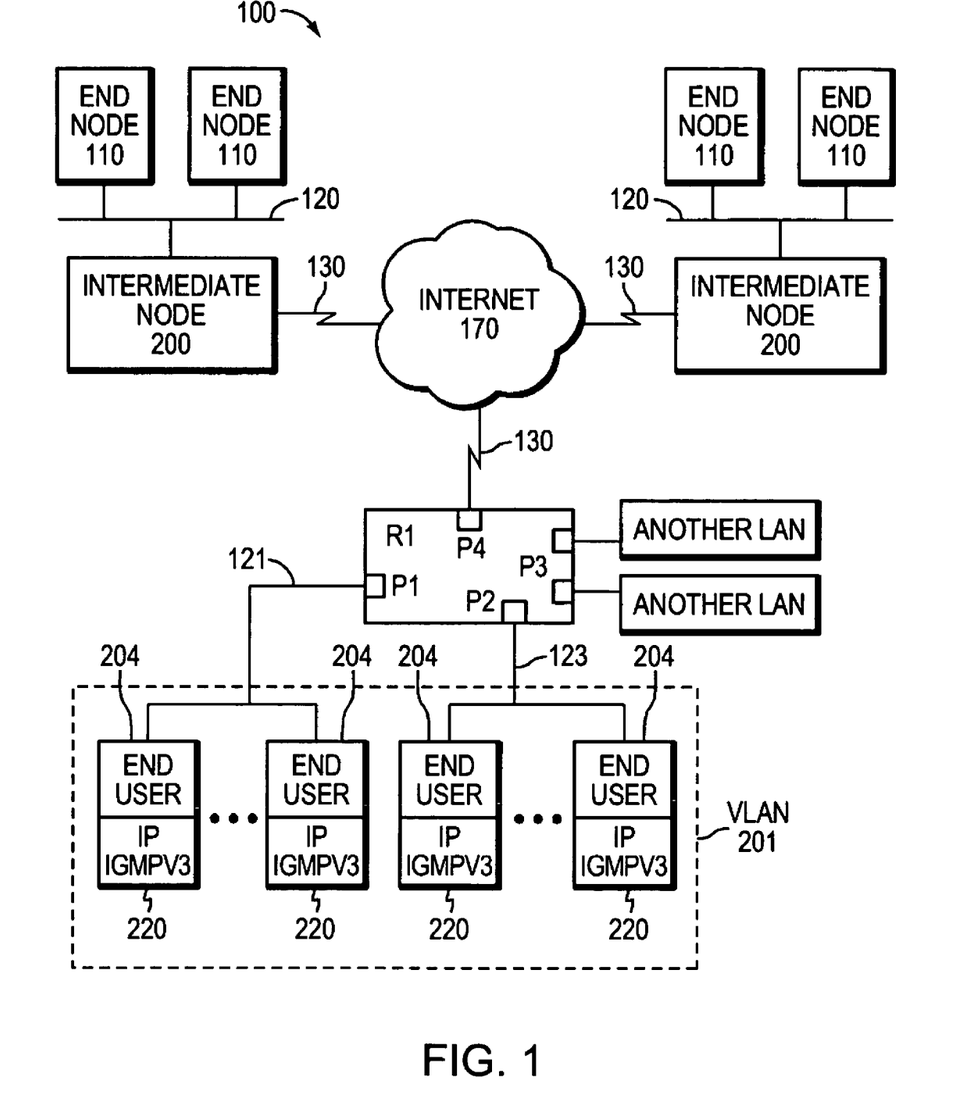
FIG. 1 is a schematic block diagram of a computer network that can be advantageously used with the present invention.

FIG. 1 is a schematic block diagram of a computer network 100 that can advantageously incorporate an embodiment of the present invention. The computer network 100 comprises a collection of communication links, segments and sub-networks connected to a plurality of nodes, such as end nodes 110 and intermediate network nodes 200. The links, segments and sub-networks may comprise local area networks (LAN's) 120, virtual LAN's (VLAN's) 201, wide area networks (WAN's) such as Internet 170 and WAN links 130 interconnected by intermediate nodes 200, such as network switches or routers, to form a network of computer nodes. A sub-network is shown of edge router R1 having two ports, P1 and P2, connected to LAN's 121 and 123, respectively. However, those two LAN's may also be part of a VLAN connecting end users 204. Another port P3 may connect to another LAN.

For video multicast, LAN's are, typically, Ethernet-to-the-home (ETTH) networks. But in other instances Token ring or other network types may connect to end users. The nodes and routers communicate with each other by exchanging data packets according to a predefined set of protocols, such as a user defined protocol (UDP) or the Transmission Control Protocol/Internet Protocol (TCP/IP), but edge routers, e.g. R1, connecting to LAN's operating under various other protocols must encapsulate the messages to accommodate the LAN protocol. UDP's typically include in their headers source, destination, message length and checksum fields in front of the data field. UDP's distinguish among multiple destinations, but usually do little else. However, even with such deficiencies (which may be handled in the applications) UDP's have found widespread use.

For ETTH connected end users, the encapsulating addressing scheme accommodates the Ethernet framing. Since such framing or encapsulation is known in the art, no further discussion is included, except for some relevant details. However, to use the present invention the end users, as discussed below, must include IP and IGMPv3 stacks and protocols 220 in order to join, leave, or change the multicast channels delivered to any one user. The end users 204 connecting to the VLAN, in this case, desire to join multicast groups. Such end users a have set-top-boxes 220 that implement IP and IGMPv3 stack protocols. The IP and IGMPv3 stack capability allows the end users to transmit Membership Queries and Reports, discussed herein.

To reiterate, these end users typically are connected together in an Ethernet LAN (ETTH) and the software in the set-top box and the RI are configured to properly encapsulate ETTH messages in the IP (IGMPv3) protocols.

Figure 2:
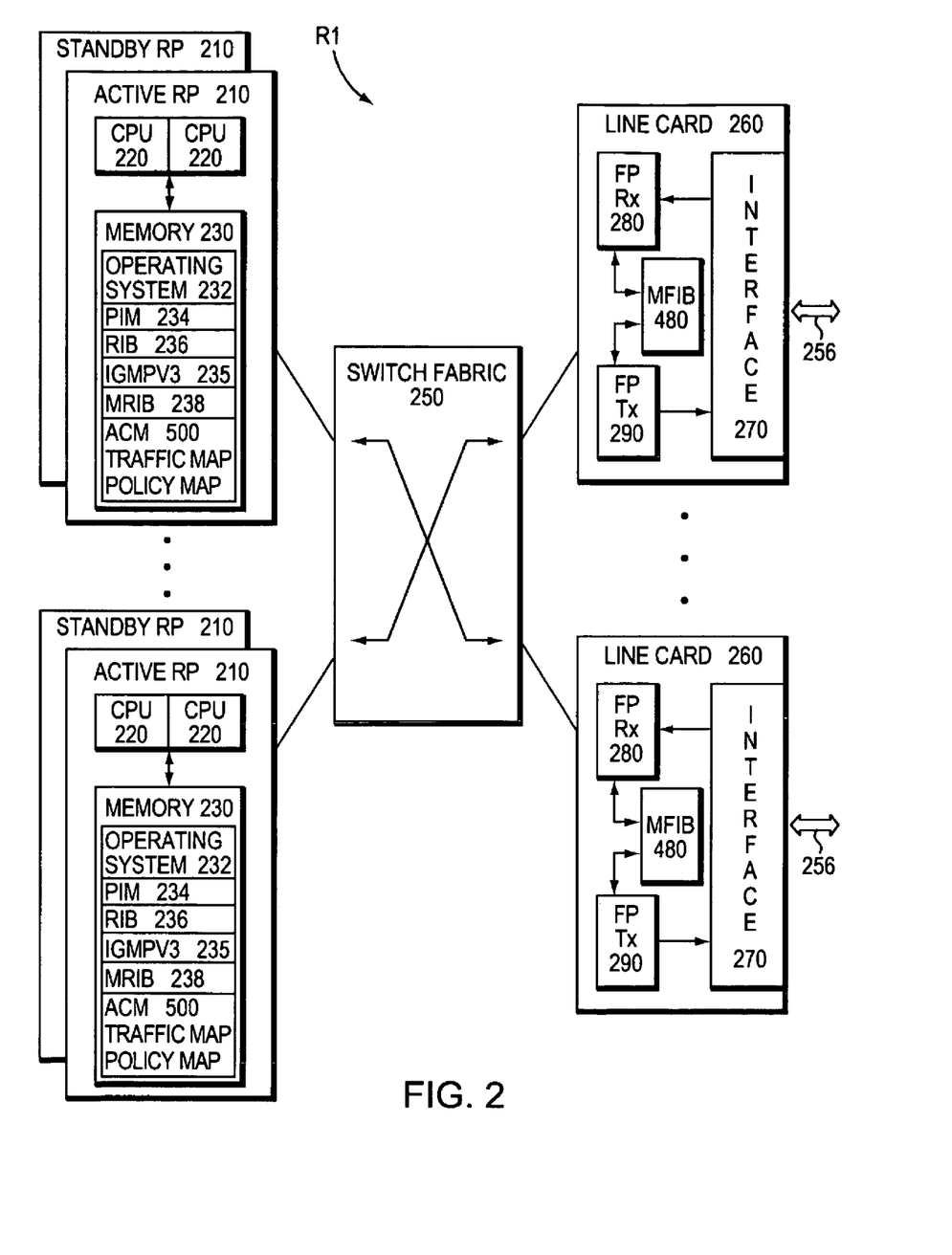
FIG. 2 is a schematic block diagram of a router.

FIG. 2 is a schematic block diagram of the edge router R1. In this instance, the router is configured as a multicast router, that may advantageously be used in conjunction with an embodiment of the present invention. The router R1 comprises a plurality of loosely coupled route processors 210 connected to a plurality of interface cards 260 that input (Rx) and output (Tx) messages. The interface cards are joined by an interconnect fabric 250 such as, e.g., a crossbar interconnection switch or high-speed bus. Those skilled in the art will recognize that other router platforms such as, e.g., a uniprocessor system or a plurality of independent nodes interconnected via a communications fabric as a multi-node cluster, could be used in accordance with the invention. In this context, the term "node" denotes a computer or processor complex comprising processors and an independent memory shared by the processors.

The route processors 210 often are configured as active and standby pairs, with each processor having a dedicated memory. The memory may comprise storage locations addressable by the processor for storing software programs and data structures associated with the invention. The route processors 210 may comprise processing elements or logic for executing the software programs and manipulating the data structures. A router operating system 232, portions of which are typically resident in memory and executed by the processor, functionally organizes the router by, inter alia, invoking network operations in support of software processes executing on the processors. These software processes include Protocol Independent Multicast (PIM) 234, Routing Information Base (RIB) 236, Internet Group Management Protocol version 3 (IGMPv3) 235, Multicast Route Information BASE (MRIB) 238, and the inventive Admission Control Module (ACM) 500. It will be apparent to those skilled in the art that other processor and memory means, including various computer readable media, may be used for storing and executing program instructions pertaining to the inventive technique described herein.

Each route processor 210 preferably comprises two central processing units, e.g., Power-PC 7460 chips, configured as a symmetric multiprocessing (SMP) pair. The CPU SMP pair is adapted to run a single copy of the router operating system 232 and access its memory space 230.

PIM 234 relies on an underlying topology-gathering protocol to populate a unicast routing table of a RIB 236 to establish and maintain routes. As used herein, a route comprises, inter alia, a combination of a set of path attributes and a prefix. The routes in the RIB table may be provided directly from the unicast routing table or by separate routing protocols, such as the Border Gateway Protocol version 4 (BGP4) and Multi-Protocol Extensions to BGP4 (MBGP). BGP4 is an interdomain routing protocol used to perform interdomain routing (for the internetwork layer) through the computer network. The neighboring routers (hereinafter "neighbors") exchange routing and network layer reachability information (NLRI) among autonomous systems over a reliable transport layer connection, such as TCP. An adjacency is a relationship formed between selected neighbors for the purpose of exchanging routing messages and abstracting the network topology. The BGP4 routing protocol standard is well known and described in *Request For Comments (RFC)* 1771, by Y. Rekhter and T. Li (1995), which is hereby incorporated herein by reference.

BGP4 is generally capable of only carrying routing information for IPv4; accordingly, MBGP extends BGP4 to allow carrying of routing information for multiple network layer protocols, including IPv6 addresses. MBGP extends BGP4 to associate these network layer protocols with next hop information and NLRI, including NLRI for multicast forwarding. Address Family Identifiers (AFIs) and Subsequent Address Family Identifiers (SAFIs) are used to identify the network layer protocols and the type of NLRI. MBGP and AFI/SAFI Address Family are well known and described in *RFC* 2858, by T. Bates et al. (2000) and *RFC* 1700 by J. Reynolds et al (1994), which are hereby incorporated herein by reference.

Figure 4:
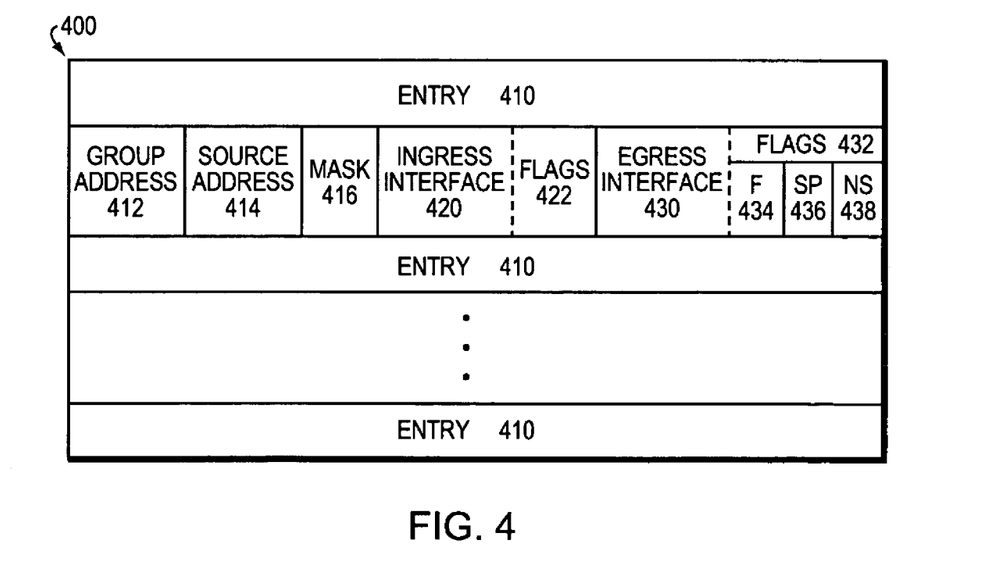
FIG. 4 is an example of a multicast forwarding table that may be advantageously used with the present invention.

In the illustrative embodiment, the router operating system 232 implements multicast components as separate software process modules that are distributed over active route processors 210 and line cards 260 which, in turn, are individually hot-swapable and may have redundant (standby) backups. To that end, the multicast modules include Multicast Forwarding Information Bases (MFIB's) 1-N 480 executing on the line cards and multicast components including the RIB 236, PIM 234, IGMPv3 235. ACM 500, and a MRIB 238 executing on the route processors 210. Operationally, the router builds the MRIB 238 (and, more specifically, its multicast routing table) after exchanging routing information with the neighbors. For example, PIM provides MRIB with a chosen reverse path forwarding (RPF) address and interface for each route, which is used to accept packets for forwarding through the router. The primary role of the MRIB 238 is to facilitate communication between the various multicast components, i.e., coordinate distribution of state between the protocol applications (e.g., PIM, IGMPv3, etc.) and between these protocols and MFIB. As a result, MRIB provides the routing information and a multicast-capable path to each multicast destination. The MFIB 480 is derived from the MRIB and is embodied as one or more multicast forwarding tables 400 that are populated on the line cards 260 and whose contents describe how to forward data packets through the router.

In the illustrative embodiment, the line cards 260 perform forwarding of the data traffic, while the route processors 210 handle routing and control of the data traffic forwarding. The interface 260 has a plurality of ports 256 with transmitting and receiving interface 270 electronics. The interface 270 is coupled to a receive forwarding processor (FP Rx) and a transmit forwarding processor (FP Tx). The FP Rx renders a forwarding decision for each packet received at a port and determines where to forward the packet. To that end, the FP Rx makes use of a multicast forwarding information base (MFIB) 480, described further herein. In the event that the packet is to be forwarded to one of the router's two route processors, the FP Rx makes use of an internal forwarding information base (IFIB) to determine to which route processor the packet should be forwarded. Likewise, the FP Tx performs lookup operations (using MFIB) on a packet transmitted from the router via one or more ports.

Figure 3:
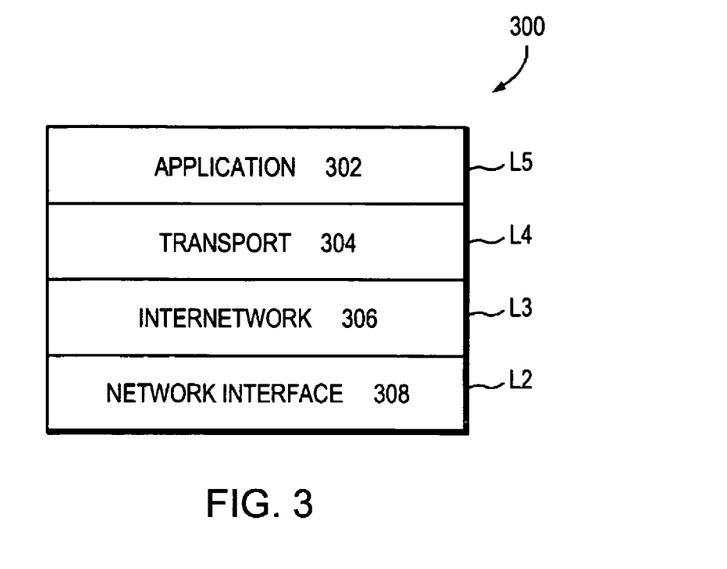
FIG. 3 is a block diagram of conventional Internet protocol layered stack.

A key function of routers in general is determining one or more interfaces to which a packet is forwarded in the router; in order to accomplish such "routing" the routers cooperate to determine best paths through the computer network 100. The routing function is preferably performed by an internetwork layer (L3) of a conventional IP protocol stack within each router. FIG. 3 is a schematic block diagram of the well known conventional network protocol stack, such as the Internet communications protocol stack 300. The architecture of the Internet protocol stack is represented by four layers termed, in ascending interfacing order, the network interface layer 308, the internetwork layer 306, the transport layer 304 and the application layer 302.

The lower network interface layer 308, is generally standardized and implemented in hardware and firmware, whereas the higher layers are typically implemented in software. The primary internetwork layer (L3) protocol of the Internet architecture is the IP protocol (IP). IP is primarily a connectionless protocol that provides for internetwork routing, fragmentation and assembly of exchanged packets—generally referred to as "datagrams" in an Internet environment—and which relies on transport protocols for end-to-end reliability and other service characteristics. An example of such a transport protocol is the UDP (described above) and the TCP protocol. The TCP is implemented by the transport layer 304 and provides connection-oriented, end-to-end reliability services to the upper layer protocols of the Internet architecture. The term TCP/IP is commonly used to denote the Internet architecture.

In particular, the internetwork layer 306 is concerned with how packets are forwarded through the network, although typically it is not directly concerned with how the MFIB's are calculated. Examples of multicast protocols, mentioned above, that may be advantageously used with the present invention include the PIM-Sparse Mode (PIM-SM) and PIM Source Specific Multicast (PIM-SSM) routing protocols, along with IGMPv3.

FIG. 4 shows a MFIB multicast forwarding table 400 that comprises a plurality of entries 410, each of which is populated by a multicast routing protocol, such as PIM, with routing information (i.e., a route). Each entry 410 includes a group address field 412 containing a multicast group network (IP) address, a source address field 414 containing a source IP address and a mask field 416 containing a mask value indicating the number of most significant bits of the group (and source) address needed to form a prefix.

Each MFIB forwarding table entry 410 also includes an ingress interface field 420 that specifies an interface on which an incoming multicast packet should be accepted, as well as an interface(s) field 430 containing a list of output (forwarding) interfaces over which the incoming packet should be forwarded. One or more control flags 422, 4532 may be associated with each interface of the entry, wherein the control flags specify certain actions/behavior to be taken by the router in response to the reception of the incoming packet. For example, a control flag F 434 indicates whether an accepted multicast packet matching the entry is to be forwarded over an associated interface, a control flag SP 436 is used to signal the route processor of the arrival of a multicast data packet and a control flag NS 438 is used to control the behavior of a forwarding engine (i.e., MFIB) in asserting the SP flag 436. Examples of control flags that may be advantageously used with the present invention are provided in U.S. patent application Ser. No. 10/376,006 titled Multicast-Routing-Protocol-Independent Realization of IP Multicast Forwarding, by I. Kouvelas et al, filed Feb. 28, 2003, which is hereby incorporated by reference as though fully set forth herein.

In response to receiving the incoming packet from a neighbor, the MFIB 480 performs a lookup into its forwarding table 400 to find a route of an entry 410 that matches a multicast destination address of the packet. The matching route instructs the router as to which interfaces the packet should be forwarded. For certain multicast routing protocols (such as PIM-SM and PIM-SSM), the multicast packet is typically accepted on a single interface, i.e., the RPF interface that represents the shortest path to the source, and is forwarded out a set of egress interfaces to other destinations (routers) that have expressed interest in receiving the data traffic. The ingress interface 420 for the matching entry may have one or more asserted control flags 422. The MFIB is configured to notify the route processor whenever an IGMPv3 packet arrives, and the ACM is configured to snoop all such arriving packets.

Figure 5:
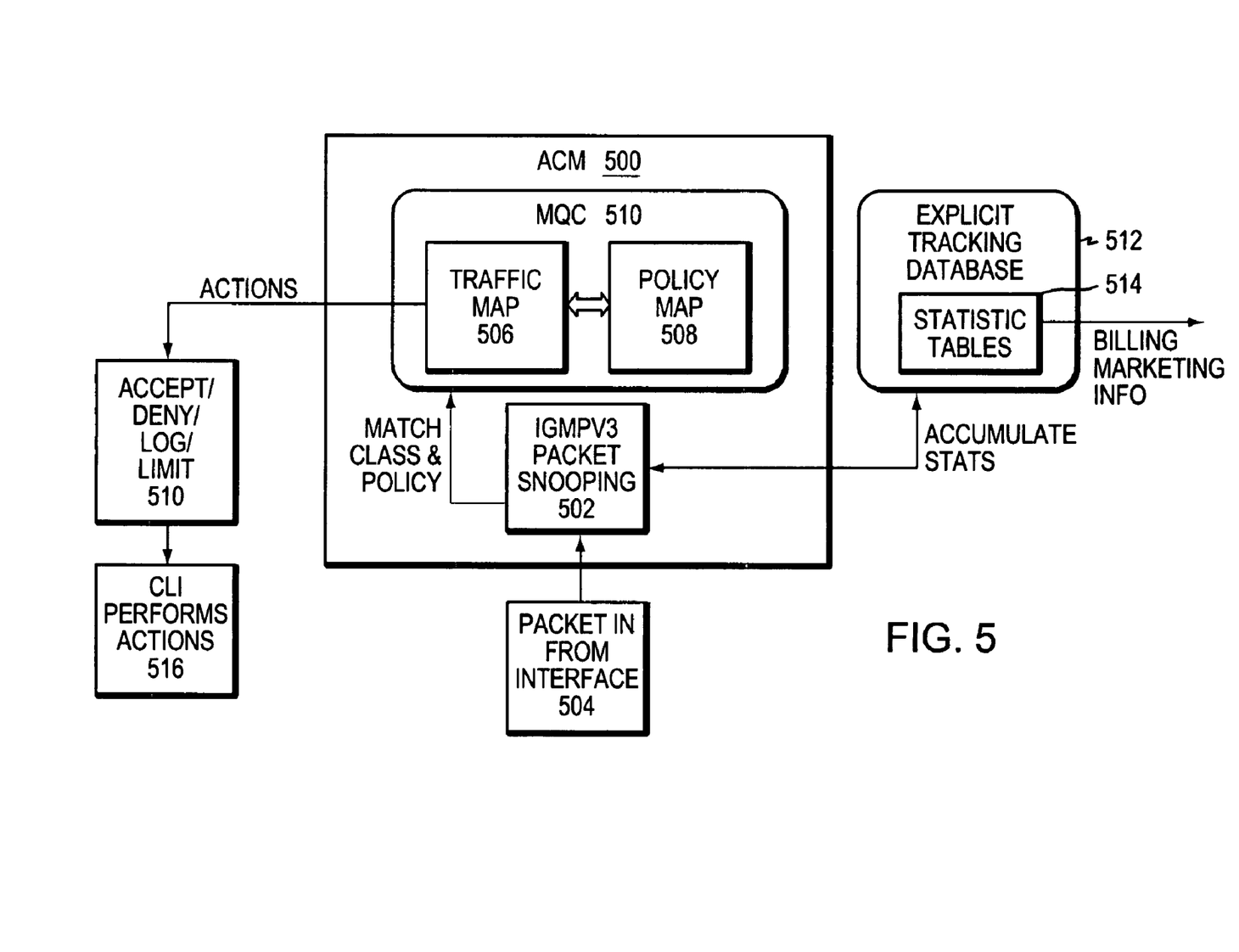
FIG. 5 is a functional block diagram of an edge router in accordance with the present invention.

FIG. 5 is a schematic block diagram of the admission Control Module (ACM) 500 that executes on an intermediate node of the network to monitor incoming request issued by the end nodes to join, leave or modify membership in multicast groups designated to receive data. The ACM accepts or denies these requests based on a configurable service policy. The ACM also prevents attacks, such as denial of service (DOS) on the intermediate node by limiting the number of joins and leave states for the multicast group. Moreover, the ACM cooperates with an Explicit Tracking Database 512 maintained by the intermediate node to record statistics of multicast data traffic for later reporting to an administrator (ISP).

The ACM 500 includes a process 502 that snoops 502 the IGMPv3 packets 504, e.g. the joins and reports from all end users, and classifies the traffic via a traffic map 506. A service policy map 508 associated with the traffic map is entered and the applicable service policy control is implemented via CLI. This allows the ACM to monitor and track the specific end users and the ports through which the joins traveled.

The ACM comprises an IGMP snooping process 502 that cooperates with the traffic 506 and policy 508 maps to control access to the video channels at the hosts. The IGMP snooping process examines the incoming IGMP packets and extracts certain information, for example: source and reporter addresses, as well as port numbers, etc. This information is applied to the traffic map that classified the multicast traffic at least by the following parameters: the IP address of the requesting host, the MAC address of the host, the IP address of the multicast groups being joined, the source channel and group addresses, the input interface and Local Area Network (LAN) address of the requestor, the IGMP version number, the maximum number of hosts allowed on a port, and the maximum number of groups or channels allowed on a specific port. If the information matches the parameters, the associated policy map is accessed to determine if any action associated with the class is required. The policy map of actions includes accepting or denying admission of the requestor, logging the time and channel packets sent to a requestor, and limiting the number of active routes the edge switch is allowed to form and/or support.

As is known, IGMPv3 adds source filtering to the earlier IGMP versions—that is the ability for a particular system to report interest in receiving packets only from specific source addresses, to support "Source Specific Multicast" (SSM). The logic mechanism within IGMPv3 allows an end user to specify receipt from "only" specific source addresses or from all source addresses "but for" certain specific source addresses. See the incorporated by reference IGMPv3 specification.

Generally within an IP system, there is a "service interface" used by upper-layer protocols and/or application program to direct the IP layer to enable or disable reception of packets sent to specific IP multicast (Class D) addresses. This service interface must support the following operation: IPMulticastListen (socket, interface, multicast-address, filter-mode, source-list). Summarizing these arguments: the "socket" distinguishes among different requesting entities within the system; the "interface" identifies the network interface which will be enabled or disabled from receiving multicast packets; the "multicast address" is the group to which the request pertains; "filter-mode" is the action of including sources or excluding sources sent to the multicast address to be received; "source-list" is the list of unicast addresses from which reception is desired or not. When multicast reception is desired the above command can have empty source-lists which function as requests to "join" a group or "leave" a group, as discussed below.

For each socket of an IPMulticastListen, the system records the desired multicast reception state for that socket. That state includes the interface associated with the socket, the multicast address, the source-list and the filter-mode. For each interface the system maintains or computes the multicast reception state for each of the interfaces. That state includes multicast address, filter-mode, and source-list.

IGMPv3 message formats classified as Membership Queries and Membership Reports have formats as follows.

Figure 6A:
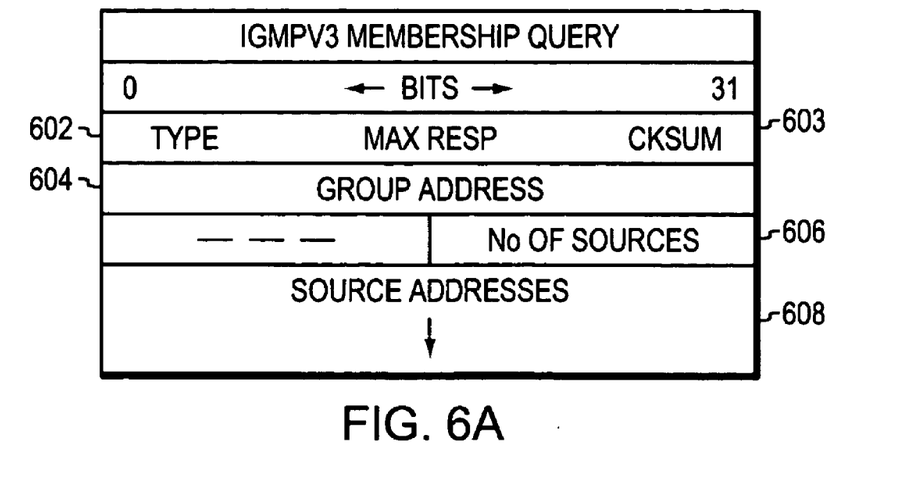
FIGS. 6A, 6B, and 6C are information formats of IGMPv3 messages.

FIG. 6A shows an IGMPv3 record packet format Membership Query. The type 602 field determines the type of IGMPv3 message. The different types include Membership Queries where routers ask the multicast reception state of neighboring interfaces—which interfaces have members attached on their local networks, only the most relevant headings are discussed as this format is known to the skilled in the art. The type 602 for a Query is 0x11, and other codes are used for reports, including "joins" and "leave(ing)" groups, etc. The group address 604 is set to a specific IP multicast address being queried, and is set to zero when sending a general query to all neighboring multicast interfaces. The number of sources 606 specifies how many source addresses are present in the query. This number is non-zero for a group-and-source specific query, and may be limited by the "packet" size of the network over which the query is transmitted. For example, over an Ethernet only 1464 octets (or 366 IP addresses (1464/4)) are available for source address, after headers, etc. The source addresses 608 are vectors of the number (the no. of sources 606) of IP unicast addresses.

Figure 6B:
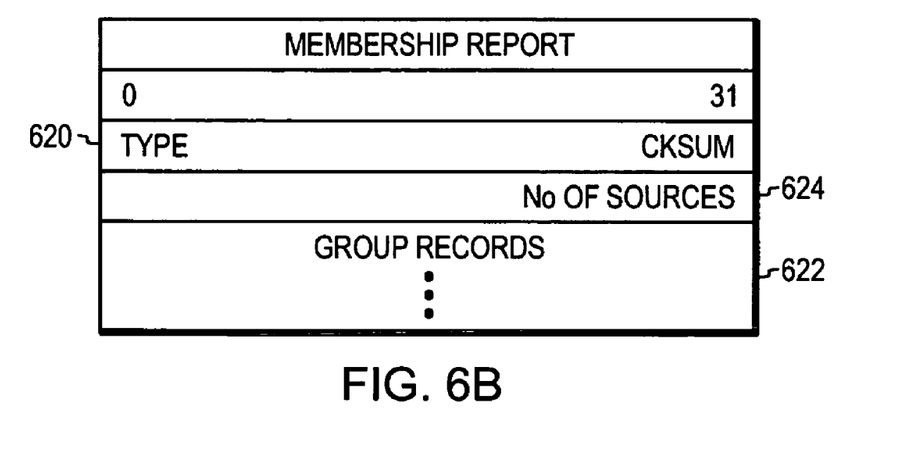

Membership reports are sent by IP systems to report the current multicast receptions state (or changes) and have the format of FIG. 6B. The number of groups 622 specifies how many group records are present in the report. Each group record contains information pertaining to the sender's membership in a single multicast group on the interface from which the report is being sent. Each group record has the format shown in the FIG. 6C.

Figure 6C:
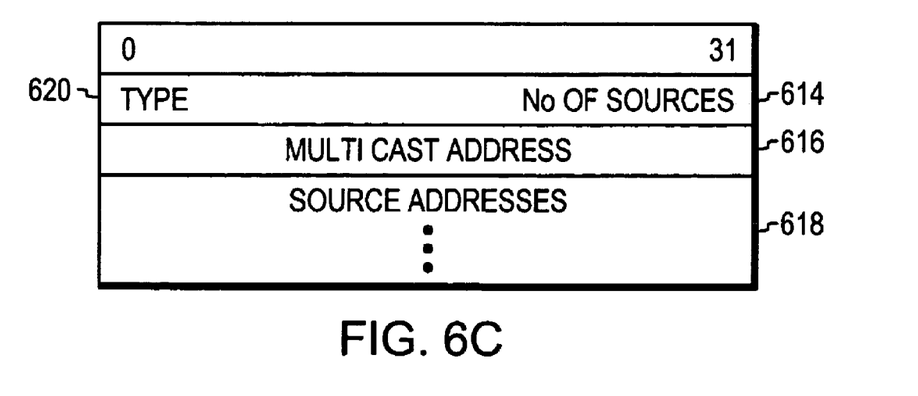

Referring to FIG. 6C, the No. or sources 614 specifies how many source addresses are present in this particular group record. The multicast address 616 is the IP multicast address to which the group record pertains. The source addresses 618 are vectors from each of IP unicast source addresses listed.

There are a number of different Report types that may be found in a report message. One type is the current state record where source address fields specifies the data stream from source addresses that will be sent to the reporting system (either by listing those included or by listing those excluded). Another type is sent by a system whenever a change in the current state record. A "join"operations is an IP multicast "listen" command, EXCLUDES, with zero source addresses; and a "leave" operation is a command, INCLUDES, with zero sources addresses. See the included by reference IGMPv3 specification for more detail.

The checksum's are the well known one's complement of the whole IGMP message.

More relevant to embodiments of the present invention are: the number of sources 606 that specifies how many (n) source addresses are present in the query. This number is zero in a General Query or Group-specific query, and none zero for a group-and-source specific query. The source addresses are a vector from n IP unicast addresses.

In this embodiment, the ACM, inter alia, will track the number of channels joined from a port, the number of joins received from a port, the number of ports that have subscribed to a channel, and the time-period that a port was a member of a channel. This, of course, is information that the ISP will use for implementing a distribution policy. In particular, IGMPv3 reports (see below) are not suppressed so they are received by the edge route processor 210 or switch and are "snooped," or read, by the ACM module 502 in conjunction with the IGMPv3 protocol. The ACM snoops IGMPv3 packets to learn and maintain group memberships and determine which ports are requesting to receive which multicast addresses from which source. At the switch level the specific ports to end users on SI receiving requests to join specific groups are read by the ACM. This information is used stored so that when multicast traffic is received at S1 it is directed only to only those ports so interested. The traffic is not directed to those ports where no end user either requested or has the status to receive the multicast. For example, referring to FIG. 1, consider one end user in the VLAN requests and is accepted into a group for receiving a video channel. Typically the router R1 would send the multicast to the VLAN network. But since the VLAN is connected to R1 via P1 and P2 the packets would be sent to both ports. But, with the ACM, the video packets are directed only to the one port through which the request was received.

Figure 7:
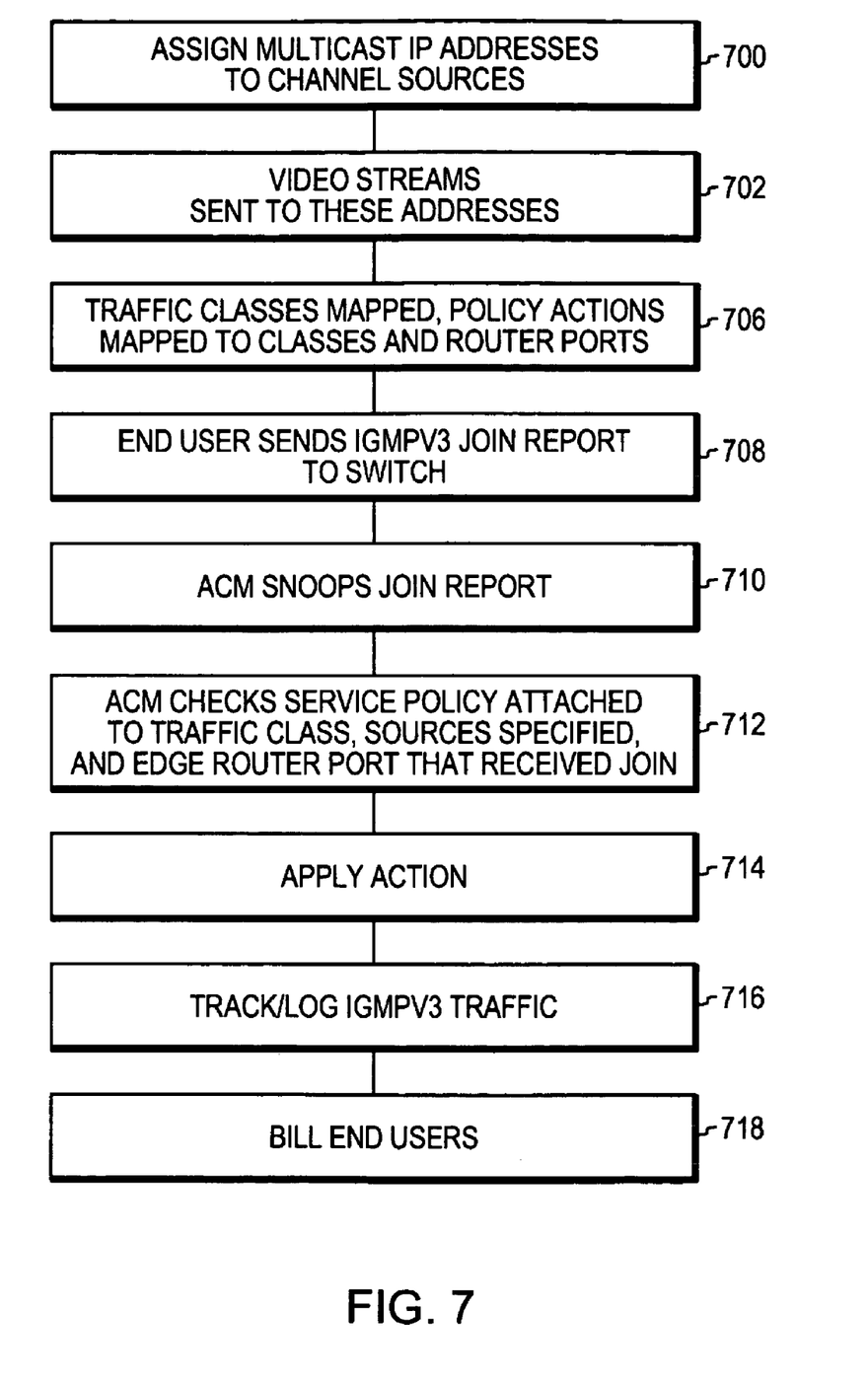
FIG. 7 is a flowchart illustrating steps implementing a preferred embodiment of the present invention.

FIG. 7 is an specific example of a flow chart illustrating a preferred embodiment of the present invention. Generally the decision is whether the IGMPv3 request should be accepted or denied. In a preferred embodiment, the command language interface (or interpreter) (CLI) is used to configure the policy to maintain a clean separation between the definition of traffic classes and the specification of the policies that applies to different classes. Those skilled in the art may define other arrangements of traffic classes and apply additional policies.

In a preferred embodiment the traffic classes are based upon: 1) IP address of the host requesting access to multicast applications, 2) MAC (Media Access Control) address of the host, 3) IP address of the multicast group being joined, 4) Channel address of a multicast stream (source, group-IP), 5) Input Interface, VLAN ID attached to a host, 6) IGMP protocol version (v3), 7) maximum no. of hosts allowed on a port, and 8) maximum number. of groups or channels allowed on a specific port.

In one embodiment, once traffic classification is complete, the following policy actions may be applied to packets matching a traffic classification: 1) Accept, 2) Deny, 3) Log, and 4) Limit.

When the ACM detects join messages it extracts the IP address, the multicast group IP address, the specific port requesting to join, and the reporter address found in the join request. If there are any service policy actions attached to the port from which the join received, the ACM determines if the packet matches the traffic class and criteria specified by the service policy. If there is a match the action is executed. In a preferred embodiment, if there is no policy the packet is processed with no denying access to any source. If the policy is "deny" the requesting host is prevented from gaining access to the designated channel.

Advantageously, the ACM snoops, tracks and accumulates statistics (LOG) in an Explicit Tracking Table, the data including, 1) the number of channels joined from each port, 2) the number of joins received from a port, 3) the number of ports subscribed for a channel, and 4) the time period that a port was a member of a channel. The statistic and data are made available to the ISP to generate billings and for other marketing information.

As mentioned above, in a preferred embodiment, there is a "LIMIT" action that may be used for preventing DOS attacks. DOS attacks try to create large streams of joins/leaves that will cause the PIM to create large routing structures or tie up the processors. If unchecked such attacks will eventually crash the system. The ACM, in an illustrative embodiment, would be loaded with a predetermining a maximum number of "joins" allowed by the switch, or "joins" received from a port, or the number of ports subscribed for a channel, or combinations thereof or of other relevant parameters. The ACM would track the number involved and compare it to the limit. When the limit is reached any additional joins will always be denied regardless of the traffic and service policy. The limit parameter may be stored in the tracking table described below, but in any event the PIM 234 and the MRIB 238 may participate in implementing such limits.

The FIG. 7 flow chart, in a preferred embodiment, begins at 700 where channel sources, like video sources, are assigned multicast IP addresses, and continues at 704 where video streams of packets are sent to these assigned addresses. Traffic class maps and service policy maps pertaining to the traffic classes and the requesting ports have been previously established at 706 by an administrator, for example, of an ISP. At 708 an end user sends an IGMPv3 join Report to its local switch. The ACM snoops the IGMPv3 packets received and if a join message is detected at 710, the ACM extracts all the traffic classification information (see the list above), and via the traffic map, checks the policy map at 712. If an action is found, it is automatically applied to the requesting port 714.

For example, after the ACM 500 classifies the traffic, it interrogates the Policy 25 map 508 that is tied to a particular traffic class and to a particular interface to determine and apply any policy found. If the action is to deny admission, the requestor does not become a member of the group, or if already a member the requestor is removed from the group and/or from the forwarding table. However, other ways to accomplish the action specified may be used by those skilled in the art.

An example of a logging record in the tracking table, 514, for each source channel, may include the following:

a) a time stamp for the first join and the MAC address of the receiver;
b) the time stamp of the last to leave and the MAC address of the receiver;
c) how long the channel is active or up;
d) the list of port numbers with receivers;
e) the source IP address;
f) MAC address for each receiver;
g) the number of channels joined from each port;
h) the number of joins/leaves/queries from each port; and
i) the number of ports/receivers subscribed to a channel.

As is known in the art, switches, bridges, routers, etc, are configured to send and receive control messages among themselves. The particular switch's IP address, for example, and the op code field is recognized as a control message to that switch. The switch is configured to respond accordingly. For example, as mentioned above, the ISP policy regarding particular ports can be communicated to the edge router in this manner. Data, for example, of usage of a particular video channel by a specific user can be relayed to an ISP for billing, marketing profiles, etc. As known to those skilled in the art, the ISP may interrogate the switch or the data in the switch may be automatically sent to the ISP on some preloaded schedule.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various multicast components described herein, can be implemented as software, including a computer-readable medium having program instructions executing on a computer, hardware, firmware, or a combination thereof In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
    snooping, at an intermediate node, an Internet Group Management Protocol (IGMP) request received from an end node, the IGMP request indicating the end node desires to join a multicast group and receive associated multicast traffic;
    extracting, at the intermediate node, a plurality of parameters from the IGMP request, the plurality of parameter including at least an address of the end node, an address of the multicast group, and an indication of a port on which the IGMP request was received;
    classifying, at the intermediate node, the multicast traffic into a particular traffic class based on a match between the plurality of parameters extracted from the IGMP request and one or more parameters of a traffic map;
    accessing, by the intermediate node, an action associated with the particular traffic class based on the match on the port on which the IGMP request was received;
    tracking a number of received IGMP requests that indicate that a plurality of end nodes desire to join the multicast group;
    determining, if the received IGMP request from the end node, indicating the end node's desire to join the multicast group, causes the number of received IGMP requests to exceed a limit;
    applying the action to control the end node's access to the multicast group on the port on which the IGMP request was received in response to the number of received IGMP requests being below the limit; and
    denying the received IGMP request, indicating the end node's desire to join the multicast group, in response to received IGMP request causing the number of received IGMP requests to exceed the limit.

2. The method of claim 1 wherein the action is to deny access.

3. The method of claim 1 further comprising:
    tracking usage statistics for the port and the end node.

4. The method of claim 3 wherein the usage statistics include a number of channels joined from the port or a time period the port was a member of a channel.

5. The method of claim 3 further comprising:
    generating a bill based on the usage statistics.

6. An apparatus comprising:
    a port configured to receive an Internet Group Management Protocol (IGMP) request from an end node, the IGMP request indicating the end node desires to join a multicast group and receive associated multicast traffic;

a packet snooper configured to detect the IGMP request and to extract a plurality of parameters from the IGMP request, the plurality of parameter including at least an address of the end node, an address of the multicast group, and an indication of the port on which the IGMP request was received;

a classifier configured to classify the multicast traffic into a particular traffic class based at least in part on a match between the plurality of parameters extracted from the IGMP request and one or more parameters of a traffic map;

a policy map that indicates an action associated with the particular traffic class based on the match;

an admission control module configured to track a number of received IGMP requests that indicate that a plurality of end nodes desire to join the multicast group, the admission control module further configured to determining if the received IGMP request from the end node causes the number of received IGMP requests to exceed a limit;

an interface configured to apply the action to control the end node's access to the multicast group on the port on which the IGMP request was received, in response to the number of received IGMP requests being below the limit; and the interface further configured to deny the received IGMP request, in response to the received IGMP request causing the number of received IGMP requests to exceed the limit.

7. The apparatus of claim 6 wherein the action is to deny access.

8. The apparatus of claim 6 further comprising:
a tracking database configured to maintain usage statistics for the port and the end node.

9. The apparatus of claim 8 wherein the usage statistics include a number of channels joined from the port, a number of IGMP requests received from the port, or a time period the port was a member of a channel.

10. The method of claim 1 wherein IGMP request is an IGMP version 3 (IGMPv3) request.

11. An apparatus comprising:
means for receiving an Internet Group Management Protocol (IGMP) request from an end node, the IGMP request indicating the end node desires to join a multicast group and receive multicast traffic associated with the multicast group;

means for snooping the IGMP request and determining a plurality of parameters for the IGMP request, the plurality of parameter including at least an address of the end node, an address of the multicast group, and an indication of the port on which the IGMP request was received;

means for classifying the multicast traffic into a particular traffic class based at least in part on a match between the plurality of parameters for the IGMP request and one or more parameters of a traffic map;

means for accessing an action associated with the particular traffic class based on the match;

means for tracking a number of received IGMP requests that indicate that a plurality of end nodes desire to join the multicast group;

means for determining if the received IGMP request from the end node, indicating the end node's desire to join the multicast group, causes the number of received IGMP requests to exceed a limit;

means for applying the action to control access to the multicast group by the end node on the port on which the IGMP request was received in response to the number of received IGMP requests being below the limit; and means for denying the received IGMP request indicating the end node's desire to join the multicast group in response to the received IGMP request causing the number of received IGMP requests to exceed the limit.

12. The apparatus of claim 11 wherein the action is to deny access.

13. The apparatus of claim 11 further comprising:
means for maintaining usage statistics for the port and the end node.

14. The apparatus of claim 13 wherein the usage statistics include a number of channels joined from the port, a number of IGMP requests received from the port, or a time period the port was a member of a channel.

15. A method comprising:
snooping, at an intermediate node, an Internet Group Management Protocol (IGMP) request received from an end node and destined for a source or rendezvous point for a multicast group, the IGMP request indicating the end node desires to join the multicast group and receive multicast traffic associated with the multicast group;

determining a plurality of parameters for the IGMP request, the plurality of parameter including at least an address of the end node, an address of the multicast group, and an indication of a port on which the IGMP request was received;

classifying the multicast traffic associated with the multicast group into a particular traffic class based on a match between the plurality of parameters for the IGMP request and one or more parameters of a traffic map;

applying a user-configured service policy to the particular traffic class, the user configured service policy to indicate an action for the particular traffic class based on the match;

applying the action indicated by the user-configured service policy to control the end node's access to the multicast group on the port on which the IGMP request was received, in response to a total number of received IGMP requests to join the multicast group being below a predetermined limit; and denying the IGMP request in response to the total number of IGMP requests to join the multicast group exceeding the predetermined limit.

16. The method of claim 15 wherein the action is to deny access.

17. The method of claim 15 further comprising:
tracking usage statistics for the port and the end node.

18. The method of claim 17 wherein the usage statistics include a number of channels joined from the port, a number of IGMP requests to join the multicast group received from the port, or a time period the port was a member of a channel.

19. The method of claim 17 further comprising:
generating a bill based on the usage statistics.

* * * * *

UNITED STATES PATENT AND TRADEMARK OFFICE
CERTIFICATE OF CORRECTION

PATENT NO. : 7,835,276 B2
APPLICATION NO. : 11/026465
DATED : November 16, 2010
INVENTOR(S) : Chickayya G. Naik It is certified that error appears in the above-identified patent and that said Letters Patent is hereby corrected as shown below:

Col. 4, Line 14, please delete "is"

Col. 7, Line 12, please replace "RI" with "R1"

Col. 12, Line 20, please replace "SI" with "S1"

Col. 13, Line 37, please remove "25"

Col. 14, Line 53, please replace "in response to" with "in response to the"

Col. 15, Line 20, please replace "mining" with "mine"

Signed and Sealed this
Third Day of May, 2011

David J. Kappos
*Director of the United States Patent and Trademark Office*